US011731661B2

(12) United States Patent
Costa et al.

(10) Patent No.: US 11,731,661 B2
(45) Date of Patent: Aug. 22, 2023

(54) SYSTEMS AND METHODS FOR IMMINENT COLLISION AVOIDANCE (71) Applicant: Argo AI, LLC, Pittsburgh, PA (US)

(72) Inventors: Albert Costa, Pittsburgh, PA (US); Mark Ollis, Pittsburgh, PA (US); Brett Browning, Pittsburgh, PA (US); Thomas Petroff, Gibsonia, PA (US)

(73) Assignee: ARGO AI, LLC, Pittsburgh, PA (US)

( * ) Notice: Subject to any disclaimer, the term of this patent is extended or adjusted under 35 U.S.C. 154(b) by 111 days.

(21) Appl. No.: 17/060,928

(22) Filed: Oct. 1, 2020

(65) Prior Publication Data
US 2022/0105963 A1 Apr. 7, 2022

(51) Int. Cl.
B60W 60/00 (2020.01)
B60W 30/095 (2012.01)
(Continued)

(52) U.S. Cl.
CPC ...... B60W 60/00274 (2020.02); B60W 30/09 (2013.01); B60W 30/0956 (2013.01);
(Continued)

(58) Field of Classification Search
CPC ............ B60W 60/0011; G05D 1/0297; G05D 2201/0213; H04L 9/3213; H04L 9/3234;
(Continued)

(56) References Cited

U.S. PATENT DOCUMENTS 6,510,388 B1   1/2003  Sporrong et al.
6,820,006 B2   11/2004 Patera
(Continued)

FOREIGN PATENT DOCUMENTS

DE   102013001228 A1   7/2014
DE   102013001229 A1   7/2014
(Continued)

OTHER PUBLICATIONS

U.S. Appl. No. 16/547,712, filed Aug. 22, 2019, Systems and Methods for Trajectory Based Safekeeping of Vehicles.
(Continued)

Primary Examiner — Russell Frejd
Assistant Examiner — Ana D Thomas
(74) Attorney, Agent, or Firm — Fox Rothschild, LLP (57) ABSTRACT Systems and methods for operating a vehicle are disclosed. The methods comprise: generating, by a computing device, a vehicle trajectory for the vehicle while the vehicle is in motion; detecting an object within a given distance from the vehicle; generating at least one possible object trajectory for the object which was detected; performing a collision check to determine whether a collision between the vehicle and the object can be avoided based on the vehicle trajectory and the at least one possible object trajectory; performing a plausibility check to determine whether the collision is plausible based on content of a map, when a determination is made in the collision check that a collision between the vehicle and the object cannot be avoided; and performing operations to selectively cause the vehicle to perform an emergency maneuver based on results of the plausibility check.

17 Claims, 8 Drawing Sheets (51) Int. Cl.
*B60W 40/04* (2006.01)
*B60W 30/09* (2012.01)
*G06V 20/58* (2022.01)

(52) U.S. Cl.
CPC ........ *B60W 40/04* (2013.01); *B60W 60/0011* (2020.02); *B60W 60/0015* (2020.02); *G06V 20/58* (2022.01); *B60W 2554/806* (2020.02); *B60W 2556/40* (2020.02)

(58) Field of Classification Search
CPC ............. H04L 2209/80; H04L 2209/84; B60R 25/241; G01S 19/40; G01S 19/42; G01S 19/52; G01S 5/0027; G01S 19/14; G08G 1/202

See application file for complete search history.

(56) References Cited

U.S. PATENT DOCUMENTS

| | | | |
|---|---|---|---|
| 8,146,703 | B2 | 4/2012 | Baumann et al. |
| 8,340,883 | B2 | 12/2012 | Arbitmann et al. |
| 8,755,998 | B2 | 6/2014 | Braennstroem et al. |
| 9,229,453 | B1 | 1/2016 | Lee |
| 9,248,834 | B1 | 2/2016 | Ferguson et al. |
| 9,495,874 | B1 | 11/2016 | Zhu et al. |
| 9,517,767 | B1 | 12/2016 | Kentley et al. |
| 9,555,781 | B2 | 1/2017 | Breuer et al. |
| 9,630,619 | B1 | 4/2017 | Kentley et al. |
| 9,669,827 | B1 * | 6/2017 | Ferguson ............. G05D 1/0088 |
| 10,005,464 | B2 | 6/2018 | Toyoda et al. |
| 10,026,318 | B2 | 7/2018 | Maeda et al. |
| 10,037,694 | B2 | 7/2018 | Lee |
| 10,046,761 | B2 | 8/2018 | Meyer et al. |
| 10,360,800 | B2 | 7/2019 | Bender et al. |
| 10,496,091 | B1 | 12/2019 | Ross et al. |
| 10,509,413 | B2 | 12/2019 | Mou |
| 10,564,639 | B1 | 2/2020 | Zhu et al. |
| 10,745,003 | B2 | 8/2020 | Kentley-Klay et al. |
| 10,928,820 | B1 | 2/2021 | Tao et al. |
| 2003/0055563 | A1 | 3/2003 | Jonas Lars et al. |
| 2008/0084283 | A1 | 4/2008 | Kalik |
| 2011/0213513 | A1 | 9/2011 | Naderhirn |
| 2011/0246156 | A1 | 10/2011 | Zecha et al. |
| 2013/0253816 | A1 | 9/2013 | Caminiti et al. |
| 2017/0039855 | A1 | 2/2017 | Maeda et al. |
| 2017/0057498 | A1 | 3/2017 | Katoh |
| 2017/0120803 | A1 | 5/2017 | Kentley et al. |
| 2017/0120902 | A1 | 5/2017 | Kentley et al. |
| 2017/0217431 | A1 | 8/2017 | Class et al. |
| 2017/0297568 | A1 | 10/2017 | Kentley et al. |
| 2017/0329332 | A1 | 11/2017 | Pilarski et al. |
| 2018/0005050 | A1 | 1/2018 | Browning et al. |
| 2018/0099663 | A1 | 4/2018 | Diedrich et al. |
| 2018/0099665 | A1 | 4/2018 | You |
| 2018/0148052 | A1 | 5/2018 | Suto et al. |
| 2018/0233048 | A1 | 8/2018 | Andersson et al. |
| 2018/0257647 | A1 | 9/2018 | Jurca et al. |
| 2019/0025841 | A1 | 1/2019 | Haynes et al. |
| 2019/0220021 | A1 | 7/2019 | Yasui et al. |
| 2019/0225150 | A1 | 7/2019 | Nohl et al. |
| 2019/0243371 | A1 | 8/2019 | Nister et al. |
| 2019/0291726 | A1 | 9/2019 | Shalev-Shwartz et al. |
| 2019/0291727 | A1 | 9/2019 | Shalev-Shwartz et al. |
| 2019/0291728 | A1 | 9/2019 | Shalev-Shwartz et al. |
| 2019/0310644 | A1 | 10/2019 | Zhang |
| 2019/0333373 | A1 | 10/2019 | Fang et al. |
| 2020/0026277 | A1 | 1/2020 | Palanisamy et al. |
| 2020/0079371 | A1 | 3/2020 | Sakamoto et al. |
| 2020/0086855 | A1 | 3/2020 | Packer et al. |
| 2020/0111366 | A1 | 4/2020 | Nanri et al. |
| 2020/0124424 | A1 | 4/2020 | Shibahata |
| 2020/0201334 | A1 * | 6/2020 | Max ..................... G08G 1/0129 |
| 2020/0262418 | A1 | 8/2020 | Lin |
| 2020/0276988 | A1 | 9/2020 | Graves |
| 2020/0331470 | A1 | 10/2020 | Nanri et al. |
| 2021/0031760 | A1 | 2/2021 | Ostafew et al. |
| 2021/0035447 | A1 | 2/2021 | Urano et al. |
| 2021/0114589 | A1 | 4/2021 | Komuro et al. |
| 2021/0181749 | A1 | 6/2021 | Pan et al. |
| 2021/0389133 | A1 | 12/2021 | Brizzi et al. |
| 2022/0105928 | A1 | 4/2022 | Foil et al. |

FOREIGN PATENT DOCUMENTS

| | | |
|---|---|---|
| EP | 3552921 A1 | 10/2019 |
| JP | 2002-236994 A | 8/2002 |
| JP | 2004301667 A | 10/2004 |
| JP | 20100228740 A | 10/2010 |
| JP | 2016122308 A | 7/2016 |
| KR | 10-2018-0040014 A | 4/2018 |
| KR | 20180104496 A | 9/2018 |
| WO | 2016094088 A1 | 6/2016 |

OTHER PUBLICATIONS

U.S. Appl. No. 16/547,718, filed Aug. 22, 2019, Systems and Methods for Trajectory Based Safekeeping of Vehicles.
U.S. Appl. No. 17/352,823, filed Jun. 1, 2021, Systems and Methods for Trajectory Based Safekeeping of Vehicles.
U.S. Appl. No. 17/060,817, filed Oct. 1, 2020, Methods and Systems for Performing Outlet Inference by an Autonomous Vehicle to Determine Feasible Paths Through an Intersection.
U.S. Appl. No. 17/060,837, filed Oct. 1, 2020, Methods and Systems for Predicting Actions of an Object by an Autonomous Vehicle to Determine Feasible Paths Through a Conflicted Area.
U.S. Appl. No. 17/207,889, filed Mar. 22, 2021, Methods and Systems for Autonomous Vehicle Inference of Routes for Actors Exhibiting Unrecognized Behavior.
U.S. Appl. No. 17/060,837, filed Oct. 10, 2020, Methods and Systems for Predicting Actions of an Object by an Autonomous Vehicle to Determine Feasible Paths Through a Conflicted Area.
Horst, John et al., "Trajectory Generation for an On-Road Autonomous Vehicle," The National Institute of Standards and Technolgoy, pp. 1-9, Sep. 2005.
Information about Related Patents and Patent Applications, see section 6 of the accompanying Information Disclosure Statement Letter, which concerns Related Patents and Patent Applications.
U.S. Appl. No. 17/352,823, filed Jun. 21, 2021, Systems and Methods for Trajectory Based Safekeeping of Vehicles.

* cited by examiner

FIG. 8B

SYSTEMS AND METHODS FOR IMMINENT COLLISION AVOIDANCE

BACKGROUND

Statement of the Technical Field

The present disclosure relates generally to on-board computers of vehicles. More particularly, the present disclosure relates to implementing systems and methods for imminent collision avoidance using, for example, extrapolated vehicle motion, delayed reaction evaluation and/or collision plausibility analysis.

Description of the Related Art

Modern day vehicles have at least one on-board computer and have internet/satellite connectivity. The software running on these on-board computers monitor and/or control operations of the vehicles.

SUMMARY

The present disclosure concerns implementing systems and methods for operating a vehicle. The methods comprise: generating, by a computing device, a vehicle trajectory for the vehicle that is in motion; detecting an object within a given distance from the vehicle; generating, by the computing device, at least one possible object trajectory for the object which was detected; performing, by the computing device, a collision check to determine whether a collision between the vehicle and the object can be avoided based on the vehicle trajectory and the at least one possible object trajectory; performing, by the computing device, a plausibility check to determine whether the collision is plausible based on content of a map, when a determination is made in the collision check that a collision between the vehicle and the object cannot be avoided; and performing operations, by the computing device, to selectively cause the vehicle to perform an emergency maneuver based on results of the plausibility check.

In some scenarios, the plausibility check comprises determining at least one plausible path of travel for the object based on a location of the object, a direction of travel of the object, and the content of the map. The map comprises lane information and direction of travel information for a plurality of lanes. The plausibility check may further comprise determining whether at least one plausible path of travel intersects the vehicle trajectory.

In those or other scenarios, the vehicle may be selectively caused to perform the emergency maneuver when a determination is made in the plausibility check that the collision is plausible. The emergency maneuver may comprise a braking command, a steering command, and/or an acceleration command. The vehicle may be selectively caused to follow the vehicle trajectory or perform a cautious maneuver when a determination is made in the plausibility check that the collision is implausible.

In those or other scenarios, the plausibility check comprises validating that a human operator is likely to cause the object to move along a course leading to a collision. The validating may be achieved by checking that (i) at least one potential destination exists for the object, (ii) a plausible path of travel starting from a location of the object to the at least one potential destination exists that is consistent with a travel direction of the object and lane information contained in the map, and (iii) the plausible path of travel intersects the vehicle trajectory.

BRIEF DESCRIPTION OF THE DRAWINGS

The present solution will be described with reference to the following drawing figures, in which like numerals represent like items throughout the figures.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Real-time prediction of actions by drivers of other vehicles and pedestrians is a challenge for on-road semi-autonomous or autonomous vehicle applications. Such real-time prediction is particularly challenging when the drivers and/or pedestrians break traffic rules. Systematically assuming the worst case action from the drivers and/or pedestrians will paralyze the self-driving vehicle, but erroneously optimistic predictions can result in unsafe autonomous vehicle behavior.

This document describes methods and systems that are directed to addressing the problems described above, and/or other issues. Accordingly, the present solution concerns systems and methods for controlling vehicles. The methods involve: generating a vehicle trajectory for the vehicle that is in motion; detecting an object within a given distance from the vehicle; generating at least one possible object trajectory for the object which was detected; and using the vehicle trajectory and at least one possible object trajectory to determine whether there is an undesirable level of risk that a collision will occur between the vehicle and the object. If there is an undesirable level of risk that a collision will occur, then the vehicle is caused to perform a plausibility check. The plausibility check is performed to determine whether it is plausible or implausible that a collision will occur in a pre-determined period of time. The vehicle trajectory is modified when (i) a determination is made that there is an undesirable level of risk that the collision will occur and (ii) a determination is made that it is plausible that a collision will occur in the pre-determined period of time. In some scenarios, the plausibility can be determined by U.S. patent application Ser. No. 17/060,817, filed Oct. 1, 2020 and U.S. patent application Ser. No. 17/060,837, filed Oct. 1, 2020.

The undesirable level of risk determination is made by: determining whether the vehicle trajectory and at least one possible object trajectory (e.g., a linear trajectory) intersect each other; and determining a collision time when the vehicle trajectory and at least one possible object trajectory intersect each other. The collision time comprises a time at which the collision will occur if the vehicle trajectory is followed by the vehicle and at least one possible object trajectory is followed by the object. The collision time is compared to a threshold time value. A determination is made that there is an undesirable level of collision risk when the collision time is equal to or less than the threshold time value.

The collision plausibility determination is made by: determining one or more plausible paths of travel for a detected object based on the object's location, the object's direction of travel, content of a road or lane map (e.g., lanes, travel directions associated with the lanes, and/or driving rules associated with the lanes), historical driving record information, and/or historical accident information; and determining (for each possible path of travel) whether at least one of the object's plausible paths of travel (e.g., linear, curved, or serpentine) intersects the vehicle's path of travel.

The present solution also involves methods for operating a vehicle that involve: generating a vehicle trajectory for the vehicle that is in motion; detecting an object within a given distance from the vehicle; generating at least one possible object trajectory for the object which was detected; performing a collision check to determine that there remains time to react safely to worst-case behavior by the object (where the collision check is based on the vehicle trajectory and at least one possible object trajectory); performing a plausibility check to determine whether it is plausible or implausible that a collision will occur; and selectively causing the vehicle to perform an emergency maneuver based on results of the collision check and the plausibility check.

The collision check comprises: determining whether the vehicle trajectory and at least one possible object trajectory intersect each other; determining a collision time when the vehicle trajectory and at least one possible object trajectory intersect each other; and comparing the collision time to a threshold time value. The collision time comprises a time at which the collision will occur if the vehicle trajectory is followed by the vehicle and at least one possible object trajectory is followed by the object.

The collision check also comprises: determining whether the collision can be avoided if the vehicle trajectory is followed by the vehicle and any one of a plurality of dynamically generated emergency maneuvers is performed in a pre-defined period of time, when the collision time is equal to or less than the threshold time value. The vehicle is selectively caused to perform the emergency maneuver (e.g., an accelerate-and-veer maneuver to avoid the collision) when a determination is made that the collision cannot be avoided in the pre-defined period of time.

The plausibility check comprises: determining one or more plausible paths of travel for a detected object based on the object's location, the object's direction of travel, the content of a road or lane map (e.g., lanes, travel directions associated with the lanes, and/or driving rules associated with the lanes), historical driving record information, and/or historical accident information; and determining (for each possible path of travel) whether at least one of the plausible paths of travel intersects the vehicle's path of travel.

The present solution has many novel features. For example, unlike some conventional solutions, the complexity of the present solution is not exponential in the number of possible mover trajectories. The present solution also explicitly deviates from optimal behavior (in most-likely-case by the minimal steering/braking modification needed to keep the AV safe, and explicitly allows for an accelerate-and-veer maneuver if such a maneuver is necessary to avoid a collision. The present solution additionally allows generation and execution of AV plans that will collide with a worst-case predicted behavior from another mover, as long as a determination is made that there remains time to react safely to the worst-case behavior, should the event occur. This ability to selectively plan and execute a trajectory that collides with a worst-case predicted behavior from another actor, while still ensuring the AV is in a safe state, is key to preventing overly hesitant AV behavior. The present solution (1) computes a safe escape trajectory which can be rapidly executed in the future (without the need for additional planning) in the event that the worst-case predictions come true, or (2) computes a damage-minimization trajectory with the least-bad consequences (according to an application-defined smooth objective function) if (1) is not possible.

Unlike many collision avoidance systems developed for use without a-priori maps, the present solution includes an extra check for plausibility that avoids false-positive alerts that can be produced from extrapolated vehicle motion alone. Unlike many traditional path planners that do make use of a priori maps, the present solution avoids braking if a collision could be avoided with later near term action. This avoids additional false-positive braking events, because it gives time for either the object to change direction (or for the AV to alter the proposed trajectory) if such time is available.

Illustrative Systems

Figure 1:
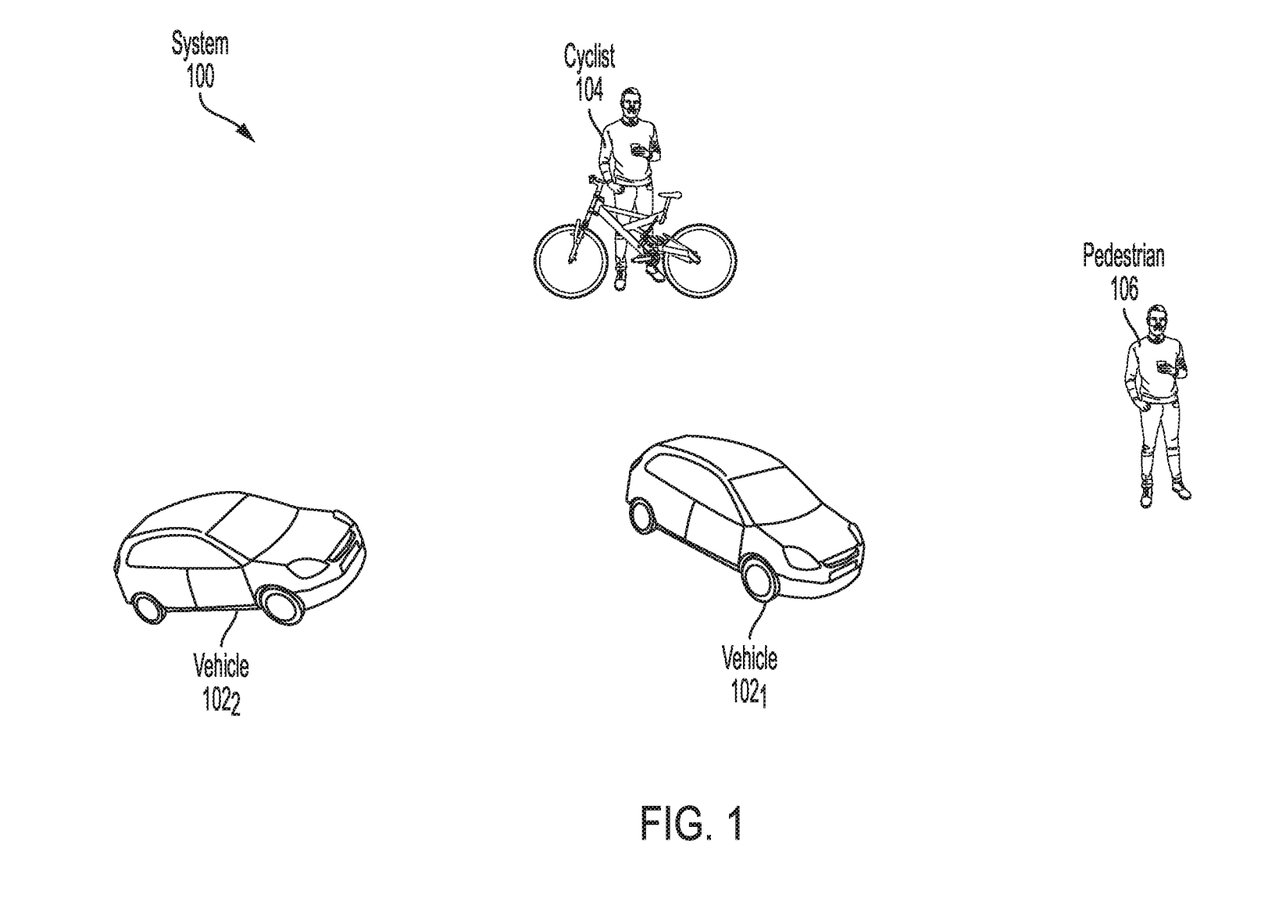
FIG. 1 is an illustration of an illustrative system.

Referring now to FIG. 1, there is provided an illustration of an illustrative system 100. System 100 comprises a vehicle $102_1$ that is traveling along a road in a semi-autonomous or autonomous manner. Vehicle $102_1$ is also referred to herein as an Autonomous Vehicle ("AV"). The AV $102_1$ can include, but is not limited to, a land vehicle (as shown in FIG. 1), an aircraft, or a watercraft.

AV $102_1$ is generally configured to detect objects $102_2$, 104, 106 in proximity thereto. The objects can include, but are not limited to, a vehicle $102_2$, cyclist 104 (such as a rider of a bicycle, electric scooter, motorcycle, or the like) and/or a pedestrian 106. When such a detection is made, AV $102_1$ performs operations to: generate one or more possible object trajectories for the detected object; and analyze at least one of the generated possible object trajectories to determine whether or not there is an undesirable level of risk that a collision will occur between the AV and object in a threshold period of time (e.g., 1 minute). If so, the AV $102_1$ performs operations to determine whether the collision can be avoided if a given vehicle trajectory is followed by the AV $102_1$ and any one of a plurality of dynamically generated emergency maneuvers is performed in pre-defined time period (e.g., N milliseconds). If the collision can be avoided, then the AV $102_1$ takes no action or optionally performs a cautious maneuver (e.g., mildly slows down). In contrast, if the collision cannot be avoided, then the AV $102_1$ is caused to assess a plausibility of extrapolated mover motion defined by possible object trajectory(ies). When the plausibility assessment indicates that it is implausible that a collision will occur in the pre-defined period of time, the AV is caused to follow the vehicle trajectory or perform a cautious maneuver (e.g., mildly slow down such as by 5-10 mph). In contrast, when the plausibility assessment indicates that it is plausible that a collision will occur in the pre-defined time period, then the AV is caused to immediately take an emergency maneuver.

Figure 2:
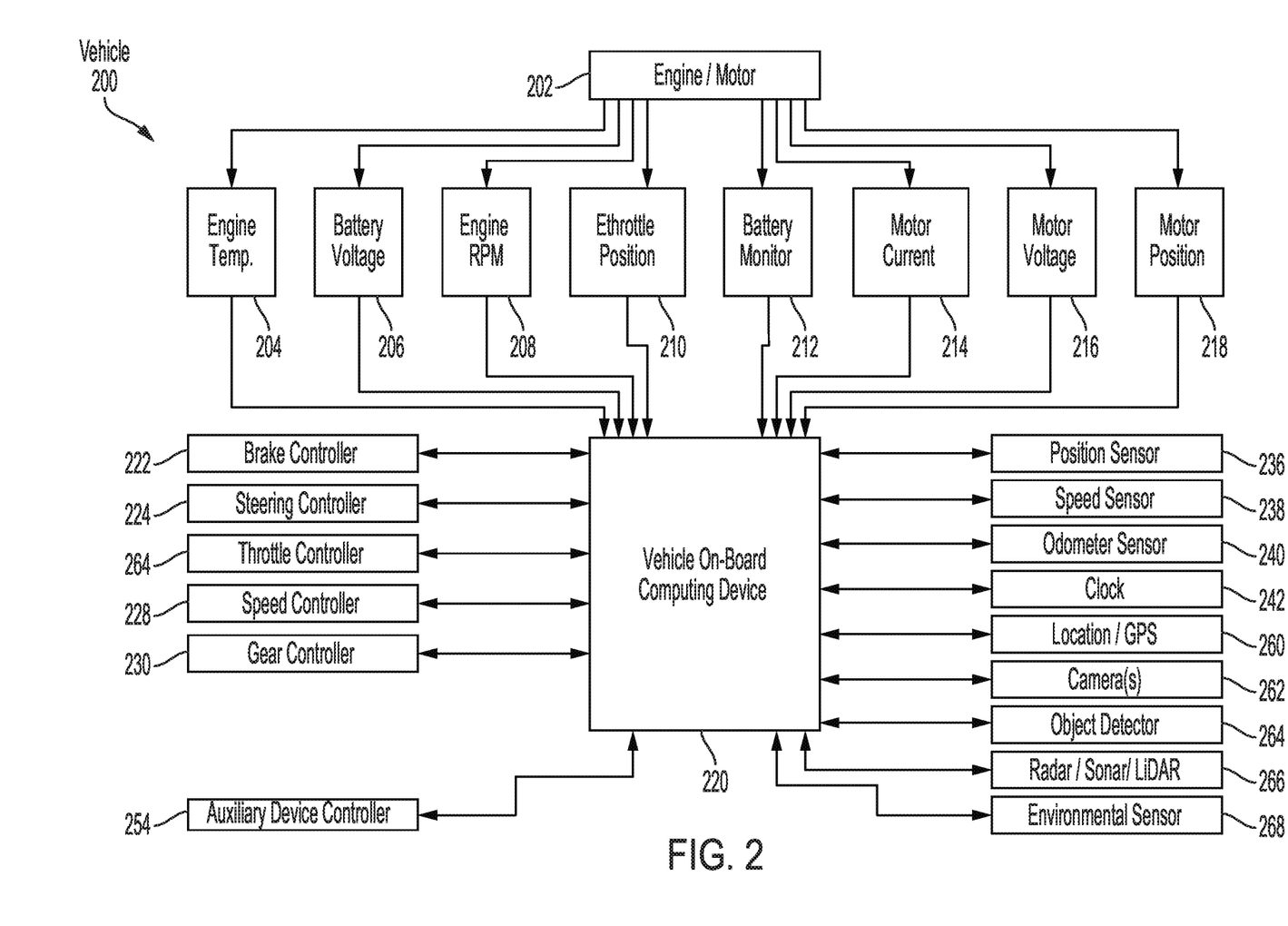
FIG. 2 is an illustration of an illustrative architecture for a vehicle.

Referring now to FIG. 2, there is provided an illustration of an illustrative system architecture 200 for a vehicle. Vehicles $102_1$ and/or $102_2$ of FIG. 1 can have the same or similar system architecture as that shown in FIG. 2. Thus, the following discussion of system architecture 200 is sufficient for understanding vehicle(s) $102_1$, $102_2$ of FIG. 1.

As shown in FIG. 2, the vehicle 200 includes an engine or motor 202 and various sensors 204-218 measuring various parameters of the vehicle. In gas-powered or hybrid vehicles having a fuel-powered engine, the sensors may include, for example, an engine temperature sensor 204, a battery voltage sensor 206, an engine rotations per minute (RPM) sensor 208, and a throttle position sensor 210. If the vehicle is an electric or hybrid vehicle, then the vehicle may have an electric motor, and accordingly will have sensors such as a battery monitoring system 212 (to measure current, voltage and/or temperature of the battery), motor current 214 and temperature 216 sensors, and motor position sensors such as resolvers and encoders 218.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 260 (e.g., a Global Positioning System (GPS) device); an object detector 264; object detection sensors such as one or more cameras 262; a LiDAR sensor system 266; and/or a radar and/or sonar system 264. The sensors also may include environmental sensors 268 such as a precipitation sensor and/or ambient temperature sensor. The object detection sensors may enable the object detector 264 and/or an vehicle on-board computing device 220 to detect objects that are within a given distance range of the vehicle 200 in any direction, while the environmental sensors collect data about environmental conditions within the vehicle's area of travel.

During operations, information is communicated from the sensors to the on-board computing device 220. The on-board computing device 220 analyzes the data captured by the sensors, and optionally controls operations of the vehicle based on results of the analysis. For example, the on-board computing device 220 may control: braking via a brake controller 222; direction via a steering controller 224; speed and acceleration via a throttle controller 226 (in a gas-powered vehicle) or motor speed controller 228 (such as a current level controller in an electric vehicle); a differential gear controller 230 (in vehicles with transmissions); and/or other controllers.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the camera(s) 262 and/or object detection information captured from sensors such as LiDAR is communicated to the on-board computing device 220. The object detection information and/or captured images are processed by the on-board computing device 220 and/or object detector 264 to detect objects in proximity to the vehicle 200. Any known or to be known technique for making an object detection based on sensor data and/or captured images can be used in the embodiments disclosed in this document.

When such the on-board computing device 220 and/or the object detector 264 detects a moving object, the on-board computing device 220 will generate one or more possible object trajectories for the detected object, and analyze the possible object trajectories to assess the risk of a collision between the object and the AV. If the risk exceeds an acceptable threshold, the on-board computing device 220 performs operations to determine whether the collision can be avoided if the AV follows a defined vehicle trajectory and/or implements one or more dynamically generated emergency maneuvers in pre-defined time period (e.g., N milliseconds). If the collision can be avoided and/or is implausible, then the on-board computing device 220 may cause the vehicle 200 to perform a cautious maneuver (e.g., mildly slows down, accelerate, or swerve). In contrast, if the collision cannot be avoided and/or is plausible, then the on-board computing device 220 will cause the vehicle 200 to take an emergency maneuver (e.g., brakes and/or changes direction of travel).

Figure 3:
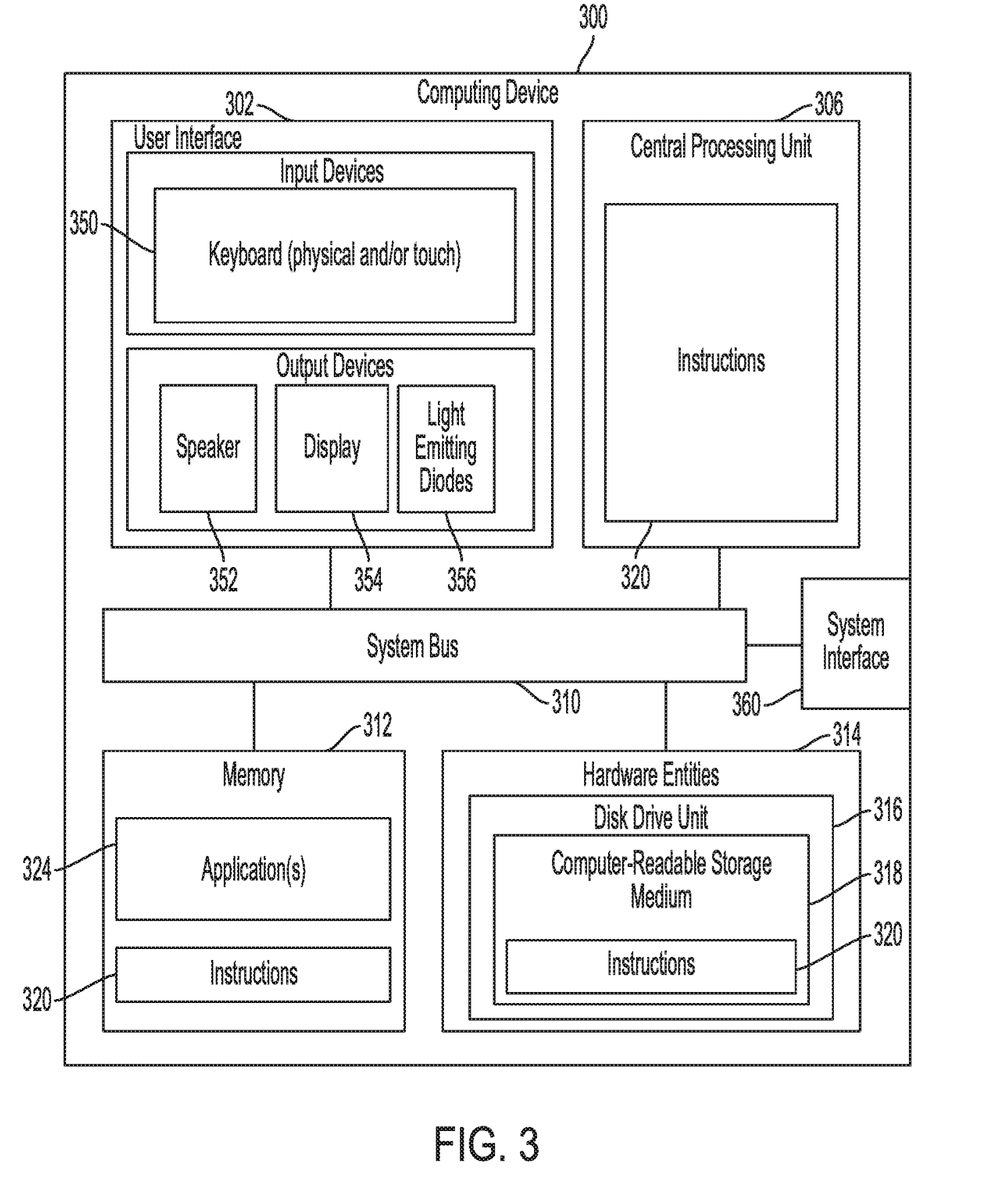
FIG. 3 is an illustration of an illustrative computing device.

Referring now to FIG. 3, there is provided an illustration of an illustrative architecture for a computing device 300. The vehicle on-board computing device 220 of FIG. 2 is the same as or similar to computing device 300. As such, the discussion of computing device 300 is sufficient for understanding the vehicle on-board computing device 220 of FIG. 2.

Computing device 300 may include more or less components than those shown in FIG. 3. However, the components shown are sufficient to disclose an illustrative solution implementing the present solution. The hardware architecture of FIG. 3 represents one implementation of a representative computing device configured to operate a vehicle, as described herein. As such, the computing device 300 of FIG. 3 implements at least a portion of the method(s) described herein.

Some or all components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a Central Processing Unit (CPU) 306, a system bus 310, a memory 312 connected to and accessible by other portions of computing device 300 through system bus 310, a system interface 360, and hardware entities 314 connected to system bus 310. The user interface can include input devices and output devices, which facilitate user-software interactions for controlling operations of the computing device 300. The input devices include, but are not limited to, a physical and/or touch keyboard 350. The input devices can be connected to the computing device 300 via a wired or wireless connection (e.g., a Bluetooth® connection). The output devices include, but are not limited to, a speaker 352, a display 354, and/or light emitting diodes 356. System interface 360 is configured to facilitate wired or wireless communications to and from external devices (e.g., network nodes such as access points, etc.).

At least some of the hardware entities 314 perform actions involving access to and use of memory 312, which can be a Random Access Memory (RAM), a disk drive, flash memory, a Compact Disc Read Only Memory (CD-ROM) and/or another hardware device that is capable of storing instructions and data. Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

Figure 4:
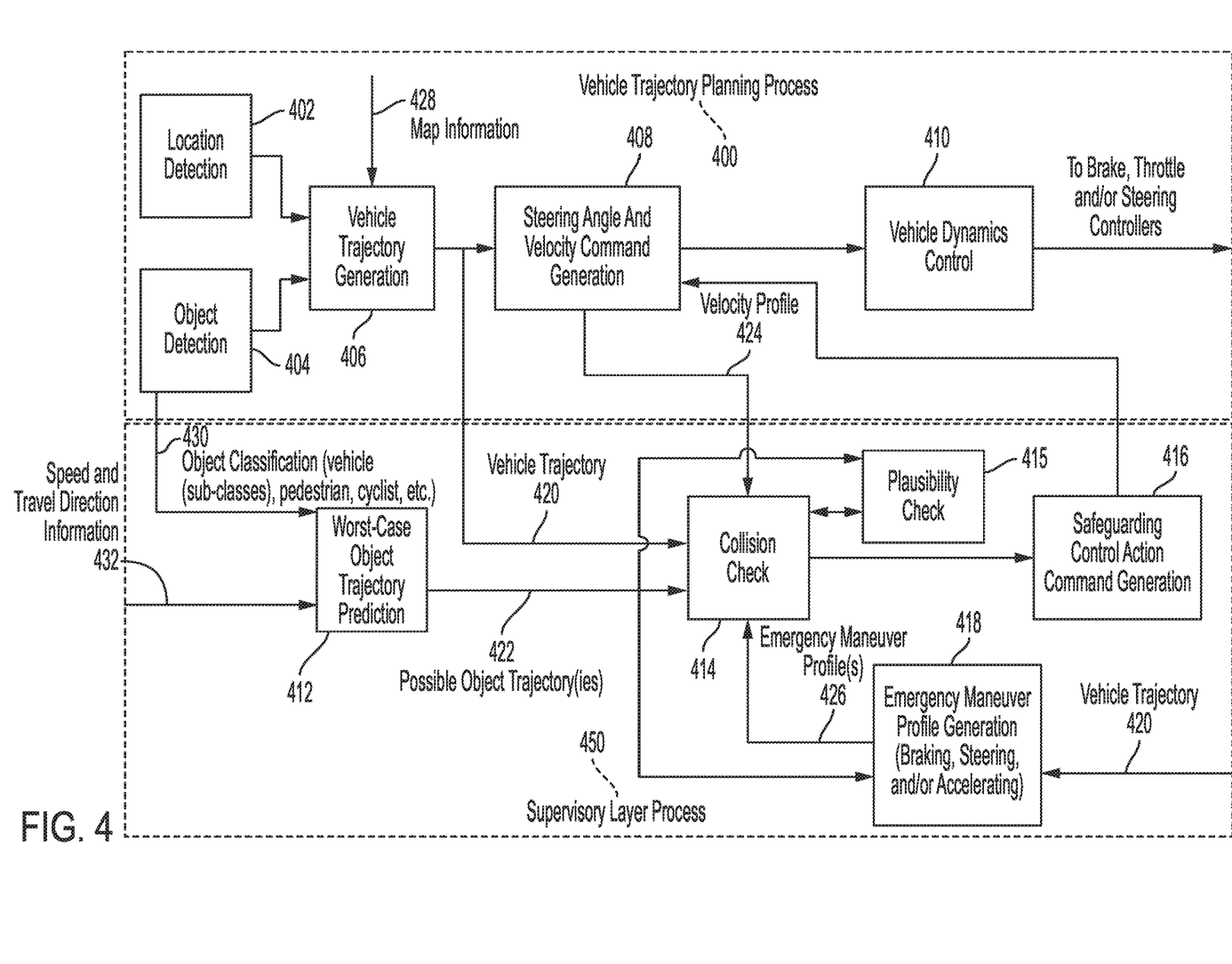
FIG. 4 provides a block diagram that is useful for understanding how vehicle control is achieved in accordance with the present solution.

Referring now to FIG. 4, there is provided a block diagram that is useful for understanding how trajectory based safekeeping of vehicles is achieved in accordance with the present solution. All of the operations performed in blocks 402-418 can be performed by the on-board computing device of a vehicle (e.g., AV $102_1$ of FIG. 1).

In block 402, a location of the vehicle is detected. This detection can be made based on sensor data output from a location sensor (e.g., location sensor 248 of FIG. 2) of the vehicle. This sensor data can include, but is not limited to, GPS data. The detected location of the vehicle is then passed to block 406.

In block 404, an object is detected within proximity of the vehicle. This detection is made based on sensor data output from an object detector (e.g., object detector 264 of FIG. 2), a radar/sonar/LiDAR system 266 and/or a camera (e.g., camera 262 of FIG. 2) of the vehicle. Information about the detected object is passed to block 406. This information includes, but is not limited to, a speed of the object and/or a direction of travel of the object.

In block 406, a vehicle trajectory is generated using the information from blocks 402 and 404. Techniques for determining a vehicle trajectory are well known in the art. Any known or to be known technique for determining a vehicle trajectory can be used herein without limitation. Illustrative algorithms for generating a trajectory are provided below. In some scenarios, the vehicle trajectory 420 is determined based on the location information from block 402, the object detection information from block 404, and map information 428 (which is pre-stored in a data store of the vehicle). The vehicle trajectory 420 represents a smooth path that does not have abrupt changes that would otherwise provide passenger discomfort. The vehicle trajectory 420 is then provided to block 408.

In block 408, a steering angle and velocity command is generated based on the vehicle trajectory 420. The steering angle and velocity command is provided to block 410 for vehicle dynamics control.

Notably, the present solution augments the above-described vehicle trajectory planning process 400 of blocks 402-410 with an additional supervisory layer process 450. The additional supervisory layer process 450 optimizes the vehicle trajectory for the most likely behavior of the objects detected in block 404, but nonetheless maintains safety if worst-case behaviors occur. This additional supervisory layer process 450 is implemented by blocks 412-418.

As shown in FIG. 4, an object classification is performed in block 404 to classify the detected object into one of a plurality of classes and/or sub-classes. The classes can include, but are not limited to, a vehicle class and a pedestrian class. The vehicle class can have a plurality of vehicle sub-classes. The vehicle sub-classes can include, but are not limited to, a bicycle sub-class, a motorcycle sub-class, a skateboard sub-class, a roller blade sub-class, a scooter sub-class, a sedan sub-class, an SUV sub-class, and/or a truck sub-class. The object classification is made based on sensor data output from an object detector (e.g., object detector 264 of FIG. 2), a LiDAR system (e.g., LiDAR system 266 of FIG. 2), radar and/or sonar system (e.g., radar/sonar system 266 of FIG. 2), and/or a camera (e.g., camera 262 of FIG. 2) of the vehicle. Techniques for classifying objects based on sensor data and/or imagery data are well known in the art. Any known or to be known object classification technique can be used herein without limitation. Information 430 specifying the object's classification is provided to block 412, in addition to the information 432 indicating the object's actual speed and direction of travel.

Block 412 involves determining one or more possible object trajectories for the object detected in 404. The possible object trajectories can include, but are not limited to, the following trajectories:

- a trajectory defined by the object's actual speed (e.g., 1 mile per hour) and actual direction of travel (e.g., west);
- a trajectory defined by the object's actual speed (e.g., 1 mile per hour) and another possible direction of travel (e.g., south, south-west, or X (e.g., 40°) degrees from the object's actual direction of travel in a direction towards the AV) for the object;
- a trajectory defined by another possible speed for the object (e.g., 2-10 miles per hour) and the object's actual direction of travel (e.g., west); and/or
- a trajectory defined by another possible speed for the object (e.g., 2-10 miles per hour) and another possible direction of travel (e.g., south, south-west, or X (e.g., 40°) degrees from the object's actual direction of travel in a direction towards the AV) for the object.

The possible speed(s) and/or possible direction(s) of travel may be pre-defined for objects in the same class and/or sub-class as the object. The one or more possible object trajectories 422 is(are) then passed to block 414.

In the case that two or more possible object trajectories are determined, then 412 may optionally also involve selecting one of the possible object trajectories which provides a worst-case collision scenario for the AV. This determination is made based on information 432 indicating the AV's actual speed and direction of travel. The selected possible object trajectory is then passed to block 414, instead of all the possible object trajectories determined in 412.

In block 414, a collision check is performed for each of the possible object trajectories 422 passed to block 414. The collision check involves determining whether there is an undesirable level of risk that a collision will occur between the vehicle and the object. Such a determination is made by first determining if the vehicle trajectory 420 and a given possible object trajectory 422 intersect. If the two trajectories 420, 422 do not intersect, then the vehicle trajectory 420 is deemed to be a safe vehicle trajectory and no safeguarding control action is taken to modify the vehicle trajectory.

In contrast, if the two trajectories 420, 422 do intersect, then a predicted time at which a collision would occur if the two trajectories are followed is determined. The predicted time is compared to a threshold value (e.g., 1 second). If the predicted time exceeds the threshold value, then the vehicle trajectory 420 is deemed to be a safe vehicle trajectory and no safeguarding control action is taken to modify the vehicle trajectory.

If the predicted time is equal to or less than the threshold value, then a determination is made as to whether the collision can be avoided if (a) the vehicle trajectory is followed by the AV and (b) any one of a plurality of dynamically generated emergency maneuvers is performed in a pre-defined time period (e.g., N milliseconds). The dynamically generated emergency maneuvers include, but are not limited to, the following:

- an emergency maneuver that comprises a braking command and that is determined based on the vehicle trajectory and a possible object trajectory;
- an emergency maneuver that comprises at least a steering command, and a braking command or an acceleration command, and that is determined via a gradient descent from the active AV trajectory on an objective function which penalizes collision and/or ride discomfort; and/or
- an emergency maneuver that comprises a pre-defined emergency maneuver that has been optimized via a gradient descent from the active AV trajectory on an objective function which penalizes collision and/or ride discomfort.

In some scenarios, an emergency braking maneuver is produced by postulating a trajectory that maintains the intended trajectory for the pre-defined time period (N milliseconds) and then decelerates at a maximum braking profile parameterized by maximum allowable deceleration and jerk limits. The maximum braking profile is produced along the original trajectory via Euler integration of a new velocity profile, or by other methods. The present solution is not limited to the particulars of these scenarios.

In those or other scenarios, an emergency maneuver that comprises both steering and braking is generated by: parameterizing both steering and braking with a limited set of spline points (e.g., 4 spline points for steering and 3 spline points for velocity); minimizing an objective function which penalizes collision and/or ride discomfort, as a function of those parameters, using conjugate gradient descent, Newton's method, Powell's method, or other existing method(s) for minimizing multivariate functions; and computing the trajectory corresponding from the parameterized spline points with the minimal objective function cost. The present solution is not limited to the particulars of these scenarios.

In those or other scenarios, a pre-defined emergency maneuver is generated by recording commands from a human operator during a simulated emergency braking event, or by sampling a small set of steering torques and braking profiles applied to the current vehicle state. These torques are computed at constant intervals from zero up until the limits of the steering and brake mechanism, or by other methods. The present solution is not limited to the particulars of these scenarios.

If it is determined that the collision can be avoided in the pre-defined time period, then the vehicle trajectory 420 is deemed to be a safe vehicle trajectory and no safeguarding control action is taken to modify the vehicle trajectory. Alternatively, the AV is caused to assess a plausibility of the extrapolated mover motion defined by the possible object trajectory(ies) 422.

The plausibility assessment is performed in block 415. The plausibility is assessed by evaluating the possible mover motion against at least an a priori road or lane map in order to validate that a human operator really is likely to drive approximately along the course leading to a collision. The plausibility assessment can also consider historical driving record information (e.g., whether an individual associated with the detected object has previously received a number of speeding tickets exceeding a threshold value within a given amount of time) and/or historical accident report information (e.g., whether an individual associated with the detected object has previously been in a number of accidents exceeding a threshold value within a given amount of time). This plausibility assessment involves checking that potential destinations (derived from the road or lane map) are reachable from the object's current position using one or more pre-stored motion models. The plausibility assessment at least considers (i) whether there is a candidate destination (such as a vehicle lane) in the a priori road or lane map near where the extrapolated mover motion is heading, and (ii) whether there is a trajectory leading from the mover's current position to the destination that is consistent with an a priori set of motion models. In this regard, the validation of the plausibility assessment may be achieved by checking that (i) at least one potential destination exists for the object, (ii) a plausible path of travel starting from a location of the object to the at least one potential destination exists that is consistent with a travel direction of the object and lane information contained in the map, and (iii) the plausible path of travel intersects the vehicle trajectory.

When the plausibility check result indicates that it is implausible that a collision will occur in the pre-defined period of time, no safeguarding control action is taken to modify the vehicle trajectory. Alternatively, the AV is caused to perform a cautious maneuver (e.g., mildly slow down such as by 5-10 mph). Techniques for causing an AV to take a cautious maneuver such as slowing down are well known in the art. For example, a safeguarding control action command is generated as shown by 416, and used to adjust or otherwise modify the vehicle trajectory at 408 prior to being passed to block 410. The vehicle trajectory can be adjusted or otherwise modified to cause the vehicle to decelerate, cause the vehicle to accelerate, and/or cause the vehicle to change its direction of travel.

In contrast, when the plausibility check result indicates that it is plausible that a collision will occur in the pre-defined time period, then the AV is caused to immediately take an emergency maneuver. This emergency maneuver may include one of the dynamically generated emergency maneuvers discussed above. Techniques for causing an AV to take emergency maneuvers are well known in the art. Illustrative techniques for causing an AV to take emergency maneuvers are described above in relation to paragraphs [0056-[0059].

Figure 5:
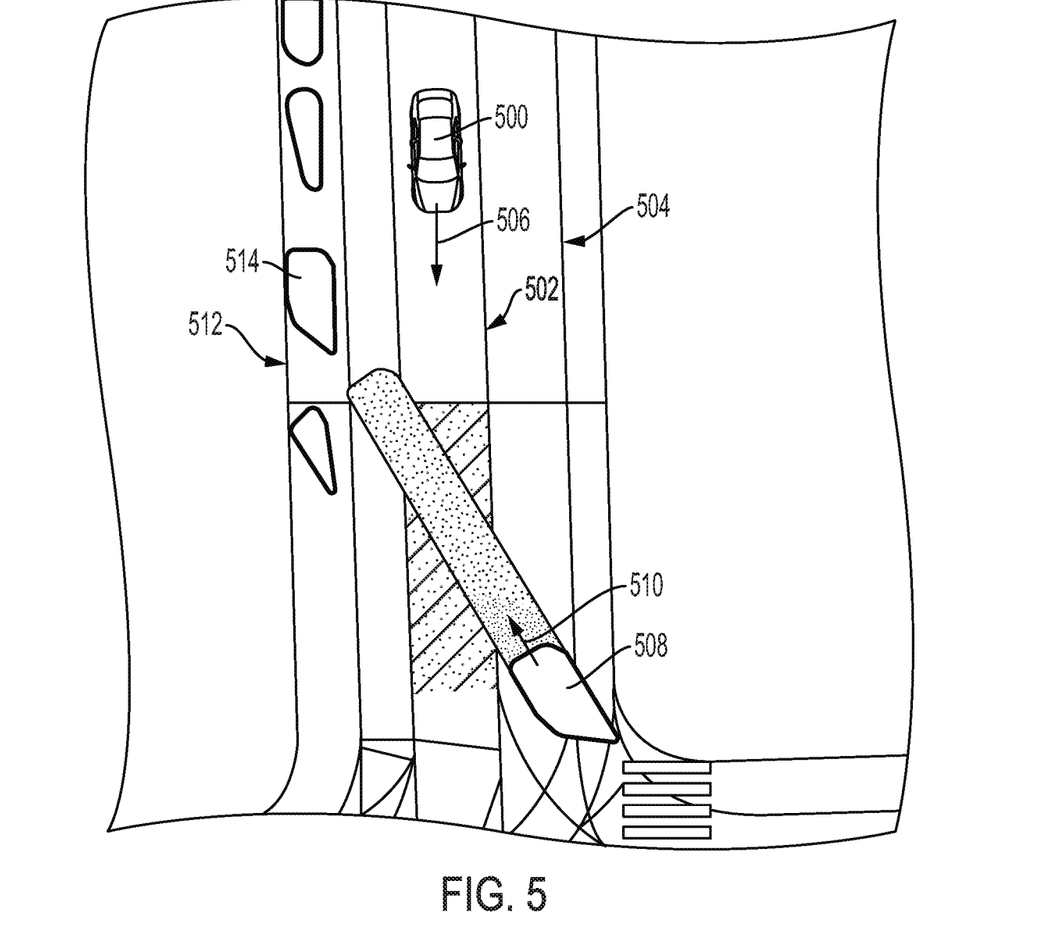
FIGS. 5-7 each provide an illustration that is useful for understanding how a plausibility check is performed.
Figure 6:
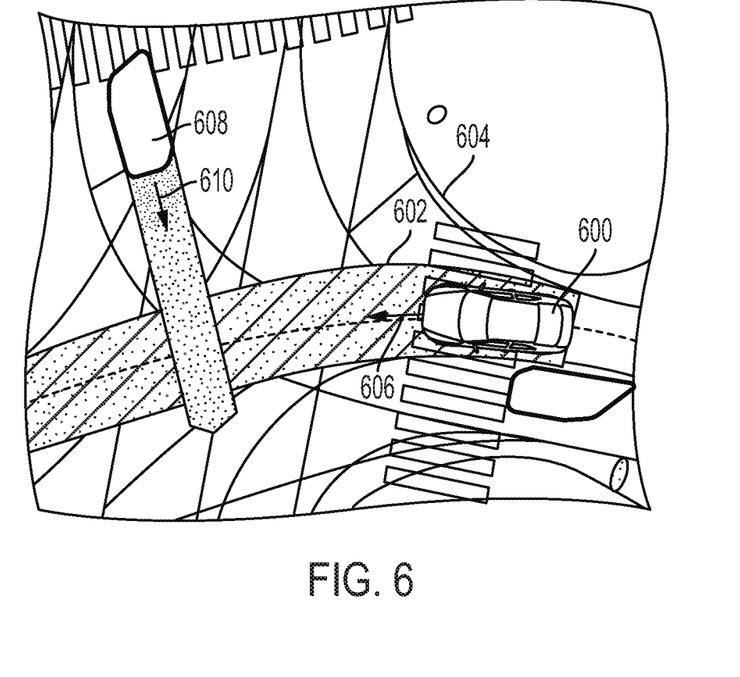
Figure 7:
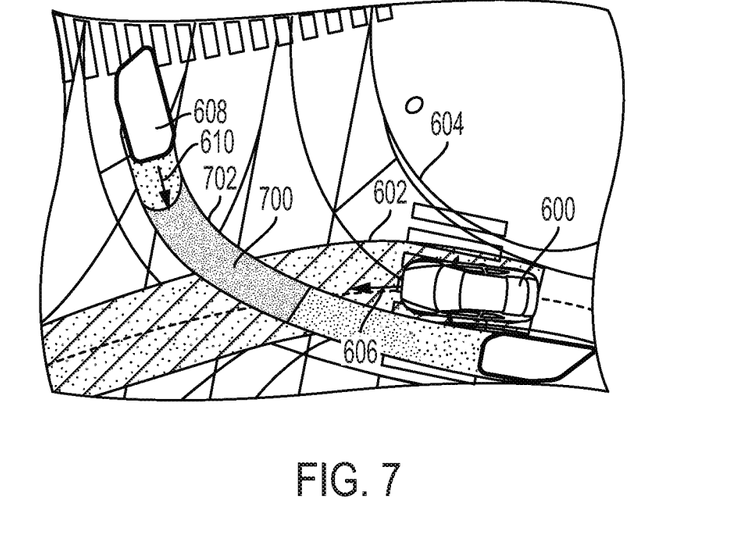

Illustrations are provided in FIGS. 5-7 that are useful for understanding the plausibility assessment and the advantages thereof. As shown in FIG. 5, an AV 500 is traveling in a direction 506 within a lane 502 of a road 504. The AV 500 has detected an object 508 in proximity thereto. Object 508 comprises a vehicle. One possible object trajectory is that the vehicle 508 will travel on the road 504 in a direction 510 along a linear path. The collision check 414 determines whether a collision can be avoided in a given amount of time. A determination is made that the collision cannot be avoided since it appears that the vehicle 508 is going to cross in front of the vehicle 500 which is traveling at an appreciable speed. In this case where the plausibility check is not employed, the AV 500 would be caused to perform an emergency maneuver even though one was not needed since the vehicle 508 is not likely going to follow the extracted object trajectory (e.g., because there is nothing in portion 512 of the road 504 to which the vehicle 508 would be driving—there is no target destination that the mover could reasonably be trying to achieve with the proposed motion since a plurality of parked cars 514 are located in portion 512). The plausibility check 415 is provided to address this situation such that the emergency maneuver is not performed by the AV 500 in this or similar scenarios where there is no plausible path of travel or destination for the object in view of the road or lane map which intersects or crosses the path of travel of the vehicle 500.

Referring now to FIGS. 6-7, an AV 600 is traveling in a direction 606 within a lane 602 of the road 604. The AV 600 has detected an object 608 in proximity thereto. Object 608 comprises a vehicle. One possible object trajectory is that the vehicle 608 will travel on the road 604 in a direction 610 along a linear path. The collision check 414 determines whether a collision can be avoided in a given amount of time. A determination is made that the collision cannot be avoided since it appears that the vehicle 608 is going to cross in front of the vehicle 600 which is traveling at an appreciable speed. Accordingly, the plausibility check 415 is performed. The plausibility check 415 is performed to determine whether there is at least one plausible path of travel or destination for the vehicle 608 based on the road or lane map which intersects or crosses the path of travel of the vehicle 600. In this case, there is a plausible path of travel 700 shown in FIG. 7 for the vehicle 608 despite the fact that such object movement is not likely since the vehicle 608 would have to run a red light for a collision to occur. The plausible path of travel is defined by a destination lane 702 which is consistent with both the object's direction of motion 610 and the contents of the road or lane map. As such, the plausibility check 415 indicates that it is plausible a collision will occur. Therefore, the AV 600 is caused to perform an emergency maneuver.

The present solution is not limited to the particulars of the scenarios discussed above in relation to FIGS. 5-7. For example, in the scenarios of FIGS. 5-7, a road or lane map is employed that includes only lane information and lane direction of travel. In other scenarios, a road or lane map is employed that includes driving rule information in addition to the lane information and lane direction of travel information. Historical driving record information and/or historical accident information may also be used during a plausibility check. For example, a plausible path of travel can include a destination lane which is consistent with the object's direction of motion and the contents of the road or lane map. A degree of plausibility of this path of travel is determined based on whether a driving rule would need to be broken if the object followed the same, and/or whether the object is likely going to follow this path of travel based on a respective driving record information and/or accident information. If the degree of plausibility exceeds a threshold value, then the result of the plausibility check indicates that it is plausible a collision will occur. Otherwise, the result of the plausibility check indicates that it is implausible that a collision will occur.

Illustrative Methods

Figure 8A:
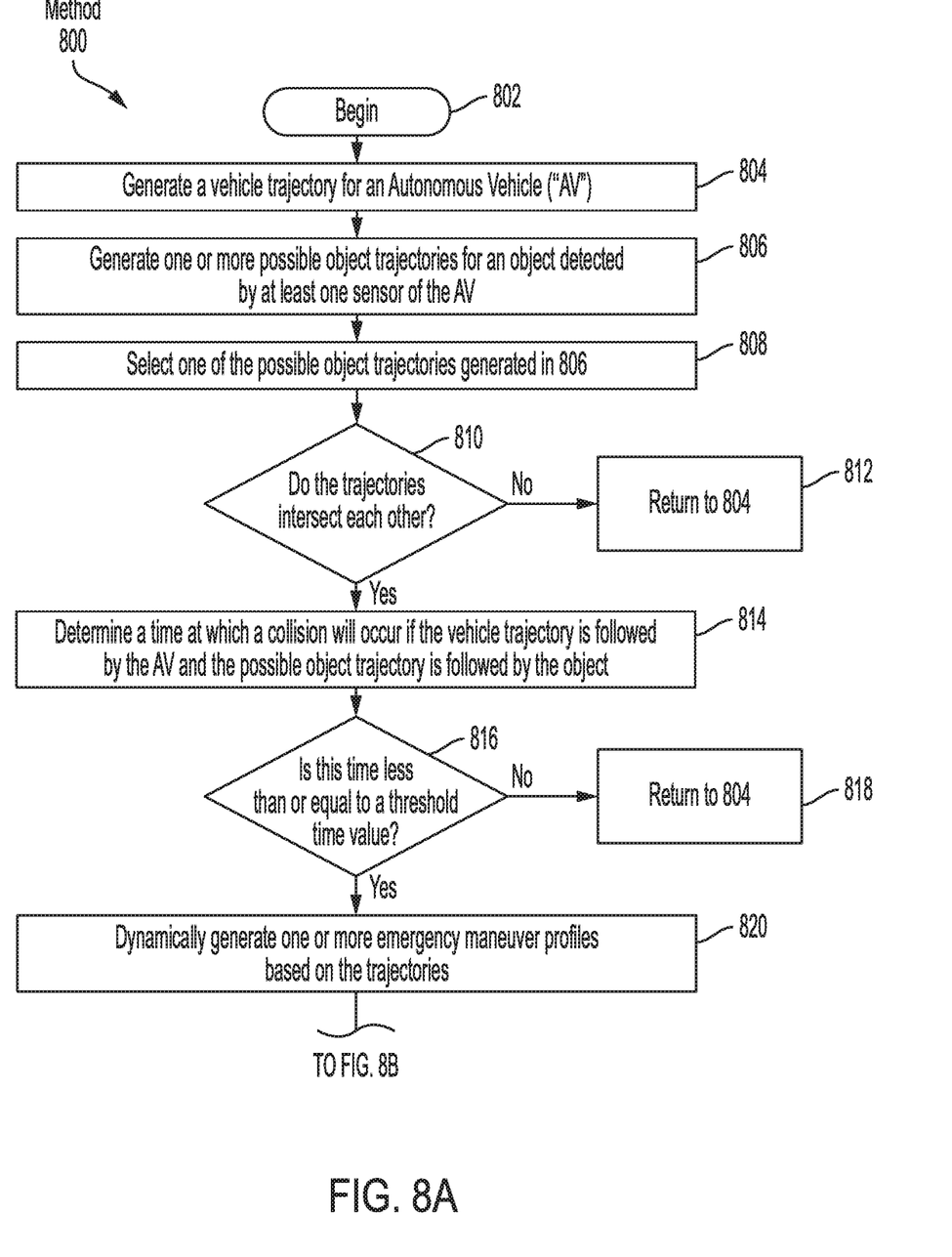
FIGS. 8A-8B (collectively referred to herein as "FIG. 8") provides a flow diagram of an illustrative method for vehicle control.
Figure 8B:
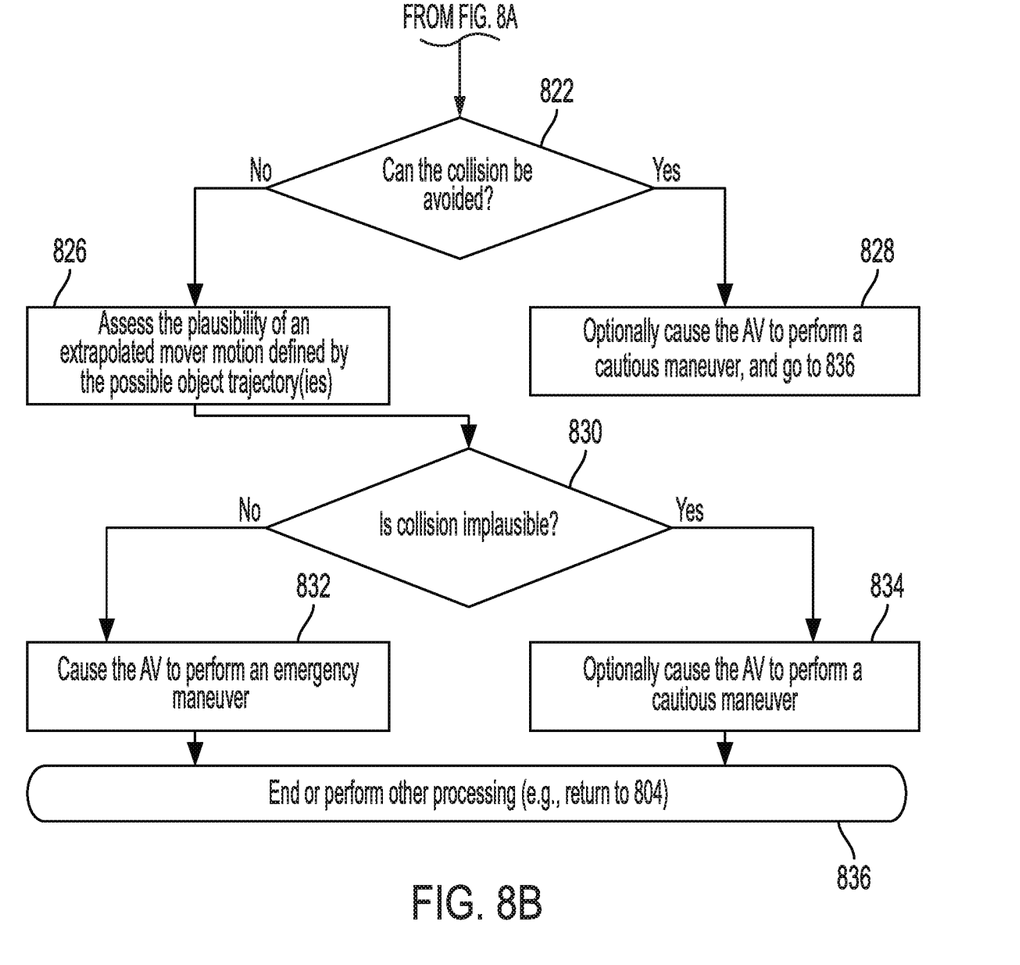

Referring now to FIG. 8, there is provided a flow diagram of an illustrative method 800 for trajectory based safekeeping of vehicles (e.g., vehicle $102_1$ of FIG. 1). At least a portion of method 800 is performed by a vehicle on-board computing device (e.g., vehicle on-board computing device 220 of FIG. 2). Method 800 is performed for each object (e.g., vehicle $102_2$ of FIG. 1, cyclist 104 of FIG. 1, and/or pedestrian 106 of FIG. 1) that has been detected to be within a distance range from the vehicle at any given time.

Method 800 comprises a plurality of operations 802-836. The present solution is not limited to the particular order of operations 802-836 shown in FIG. 8. For example, the operations of 820 can be performed in parallel with the operations of 804-818, rather than subsequent to as shown in FIG. 8.

As shown in FIG. 8A, method 800 begins with 802 and continues with 804 where a vehicle trajectory (e.g., vehicle trajectory 420 of FIG. 4) for an AV is generated. The vehicle trajectory represents a smooth path that does not have abrupt changes that would otherwise provide passenger discomfort. Techniques for determining a vehicle trajectory are well known in the art. Any known or to be known technique for determining a vehicle trajectory can be used herein without limitation. In some scenarios, the vehicle trajectory is determined based on location information generated by a location sensor (e.g., location sensor 248 of FIG. 2) of the AV, object detection information generated by at least one object detector (e.g., object detector 264 of FIG. 2) of the AV, images captured by at least one camera (e.g., camera 262 of FIG. 2) of the AV, and map information stored in a memory (e.g., memory 312 of FIG. 3) of the AV. In other scenarios, lane information is used as an alternative to or in addition to the location information and/or map information.

Once the vehicle trajectory is generated, method 800 continues with 806 where one or more possible object trajectories (e.g., possible object trajectories 422 of FIG. 4) are determined for an object (e.g., vehicle $102_2$, cyclist 104 or pedestrian 106 of FIG. 1) detected by at least one sensor (e.g., sensor 260 or camera 262 of FIG. 2) of the AV. The possible object trajectories can include, but are not limited to, the following trajectories: a trajectory defined by the object's actual speed (e.g., 1 mile per hour) and actual direction of travel (e.g., west); a trajectory defined by the object's actual speed (e.g., 1 mile per hour) and another possible direction of travel (e.g., south, south-west, or X (e.g., 40°) degrees from the object's actual direction of travel in a direction towards the AV); a trajectory defined by another possible speed for the object (e.g., 2-10 miles per hour) and the object's actual direction of travel (e.g., west); and/or a trajectory defined by another possible speed for the object (e.g., 2-10 miles per hour) and another possible direction of travel (e.g., south or south-west or X (e.g., 40°) degrees from the object's actual direction of travel in a direction towards the AV). The possible speed(s) and/or possible direction(s) of travel may be pre-defined for objects in the same class and/or sub-class as the object. In some scenarios, the object trajectory(ies) comprise trajectories defined by linear paths of travel.

Next in 808, one of the possible object trajectories is selected for subsequent analysis. In some scenarios, the operations of 810-824 are performed (e.g., in an iterative or parallel manner) for each possible object trajectory generated in 806. In other scenarios, the operations of 810-824 are performed for only one of the possible object trajectories which provides a worst-case collision scenario for the AV. This worst-case possible object trajectory is selected based on information indicating the AV's actual speed and direction of travel (e.g., generated by a speed sensor 238 of FIG. 2 and/or location sensor 248 of FIG. 2). A worst-collision scenario may include, but is not limited to, a collision scenario which is to occur sooner than all other collision scenarios provided by the possible object trajectories and/or is expected to result in serious injury or death (e.g., a high speed, side-impact collision or a high speed, head-on collision). In yet other scenarios, the operations 810-824 are performed for two or more of the possible object trajectories which provide the top Z (e.g., 2 or 5) worst-case collision scenarios for the AV. Z is an integer selected in accordance with a particular application. The present solution is not limited to the particulars of these scenarios.

Next in 810, a determination is made as to whether the vehicle trajectory generated in 804 and the possible object trajectory selected in 808 intersect each other. If the two trajectories do not intersect each other [810:NO], then 812 is performed where method 800 returns to 804.

In contrast, if the two trajectories do intersect each other [810:YES], then method 800 continues to 814 where a time value is determined. This time value represents a time at which a collision will occur if the vehicle trajectory is followed by the AV and the possible object trajectory is followed by the object. The time value determined in 814 is then compared to a threshold time value, as shown by 816. The threshold time value is selected in accordance with a given application (e.g., one or more seconds). If the time value is greater than the threshold time value [816:NO], then 818 is performed where method 800 returns to 804. If the time value is equal to or less than the threshold time value [816:YES], then method 800 continues with 820 of FIG. 8A and 822 of FIG. 8B. 820-822 involve: dynamically generating one or more emergency maneuver profiles based on the vehicle trajectory and the possible object trajectory; and determine whether the collision can be avoided if the vehicle trajectory is followed by the AV and any one of the emergency maneuvers is performed in a pre-defined time period (e.g., N milliseconds). Upon completing 822, method 800 continues with 826 of FIG. 8B.

As shown in FIG. 8B, if the collision can be avoided in the pre-defined time period [822:YES], then 828 is performed where the AV is optionally caused to take a cautious maneuver (e.g., mildly slow down). Techniques for causing an AV to take a cautious maneuver such as slowing down are well known in the art. Any known or to be known technique for causing an AV to take a cautious maneuver can be used here. Subsequently, 836 is performed where method 800 ends or other processing is performed.

In contrast, if the collision cannot be avoided in the pre-defined time period [822:NO], then 826 is performed where the AV is caused to assess the plausibility of an extrapolated mover motion defined by the possible object trajectory(ies). If the plausibility assessment indicates that it is implausible that a collision will occur in a pre-determined period of time [830:YES], then method 800 continues with 834. In 834, the AV is optionally caused to take a cautious maneuver (e.g., mildly slow down). Techniques for causing an AV to take a cautious maneuver such as slowing down are well known in the art. Any known or to be known technique for causing an AV to take a cautious maneuver can be used here. Subsequently, 836 is performed where method 800 ends or other processing is performed.

In contrast, if the plausibility assessment indicates that it is plausibility that a collision will occur in the pre-determined period of time, then method 800 continues with 832 where the AB is caused to immediately take an emergency maneuver. The emergency maneuver can include, but is not limited to, one of the dynamically generated emergency maneuvers discussed above in relation to 820. Techniques for causing an AV to take emergency maneuvers are well known in the art. Any known or to be known technique for causing an AV to take emergency maneuvers can be used here. Subsequently, 836 is performed where method 800 ends or other processing is performed.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a first vehicle, comprising:
generating, by a computing device, a vehicle trajectory for a first vehicle while the first vehicle is in motion;
detecting an object within a given distance from the first vehicle;
generating, by the computing device, at least one possible object trajectory for the object which was detected;
performing, by the computing device, a collision check to determine whether a collision between the first vehicle and the object can be avoided based on the vehicle trajectory and the at least one possible object trajectory;
performing, by the computing device, a plausibility check to determine whether the collision is plausible based on content of a map, when a determination is made in the collision check that a collision between the first vehicle and the object cannot be avoided; and
performing operations, by the computing device, to selectively modify operations of the first vehicle based on results of the plausibility check;
wherein the object comprises a second vehicle with an associated individual and the plausibility check comprises (i) generating a degree of plausibility of at least one plausible path of travel for the object and (ii) using a result from comparing the degree of plausibility to a threshold value for validating that it is plausible the associated individual could drive the second vehicle such that the second vehicle travels along a course leading to a collision; and
wherein the degree of plausibility is generated based on historical data relating to previous operation of the second vehicle by the associated individual.

2. The method according to claim 1, wherein the at least one plausible path of travel for the object is determined based on a location of the object, a direction of travel of the object, and the content of the map.

3. The method according to claim 2, wherein the map comprises lane information and direction of travel information for a plurality of lanes.

4. The method according to claim 2, wherein the plausibility check further comprises determining whether the at least one plausible path of travel intersects the vehicle trajectory.

5. The method according to claim 1, wherein operations of the first vehicle are modified by selectively changing the vehicle trajectory when a determination is made in the plausibility check that the collision is plausible.

6. The method according to claim 1, further comprising performing operations, by the computing device, to selectively cause the first vehicle to follow the vehicle trajectory when a determination is made in the plausibility check that the collision is implausible.

7. The method according to claim 5, wherein the vehicle trajectory is changed to cause the first vehicle to at least one of brake, steer, and accelerate.

8. The method according to claim 1, further comprising performing operations, by the computing device, to selectively cause the first vehicle to perform a particular maneuver when a determination is made in the plausibility check that the collision is implausible, the particular maneuver changing a behavior of the first vehicle by an amount less than that associated with another maneuver performed by the first vehicle when the collision is plausible.

9. A system, comprising:
a processor;
a non-transitory computer-readable storage medium comprising programming instructions that are configured to cause the processor to implement a method for operating a first vehicle, wherein the programming instructions comprise instructions to:
generate a vehicle trajectory for the first vehicle while the first vehicle is in motion;
detect an object within a given distance from the first vehicle;
generate at least one possible object trajectory for the object which was detected;
perform a collision check to determine whether a collision between the first vehicle and the object can be avoided based on the vehicle trajectory and the at least one possible object trajectory;
perform a plausibility check to determine whether the collision is plausible based on content of a map, when a determination is made in the collision check that a collision between the vehicle and the object cannot be avoided; and
selectively cause operations of the first vehicle to be modified based on results of the plausibility check;
wherein the object comprises a second vehicle with an associated individual and the plausibility check comprises (i) generating a degree of plausibility of at least one plausible path of travel for the object and (ii) using a result from comparing the degree of plausibility to a threshold value for validating that it is plausible the associated individual could drive the second vehicle to travel along a course leading to a collision; and
wherein the degree of plausibility is generated based on historical data relating to previous operation of the second vehicle by the associated individual.

10. The system according to claim 9, wherein the at least one plausible path of travel for the object is determined based on a location of the object, a direction of travel of the object, and the content of the map.

11. The system according to claim 10, wherein the map comprises lane information and direction of travel information for a plurality of lanes.

12. The system according to claim 10, wherein the plausibility check further comprises determining whether the least one plausible path of travel intersects the vehicle trajectory.

13. The system according to claim 9, wherein operations of the first vehicle are modified by selectively changing the vehicle trajectory when a determination is made in the plausibility check that the collision is plausible.

14. The system according to claim 9, wherein the programming instructions further comprise instructions to selectively cause the first vehicle to follow the vehicle trajectory when a determination is made in the plausibility check that the collision is implausible.

15. The system according to claim 13, wherein the vehicle trajectory is changed to cause the first vehicle to at least one of brake, steer, and accelerate.

16. The system according to claim 9, wherein the programming instructions further comprise instructions to selectively cause the first vehicle to perform a particular maneuver when a determination is made in the plausibility check that the collision is implausible, the particular maneuver changing a behavior of the first vehicle by an amount less than that associated with another maneuver performed by the first vehicle when the collision is plausible.

17. A non-transitory computer-readable medium that stores instructions that are configured to, when executed by at least one computing device, cause the at least one computing device to perform operations comprising:

generating a vehicle trajectory for a vehicle while a first vehicle is in motion;

detecting an object within a given distance from the first vehicle;

generating at least one possible object trajectory for the object which was detected;

performing a collision check to determine whether a collision between the vehicle and the object can be avoided based on the vehicle trajectory and the at least one possible object trajectory;

performing a plausibility check to determine whether the collision is plausible based on content of a map, when a determination is made in the collision check that a collision between the vehicle and the object cannot be avoided; and performing operations to selectively modify operations of the first vehicle based on results of the plausibility check;

wherein the object comprises a second vehicle with an associated individual and the plausibility check comprises (i) generating a degree of plausibility of at least one plausible path of travel for the object and (ii) using a result from comparing the degree of plausibility to a threshold value for validating that it is plausible the associated individual could drive the second vehicle such that the second vehicle travels along a course leading to a collision; and wherein the degree of plausibility is generated based on historical data relating to previous operation of the second vehicle by the associated individual.

* * * * *